United States Patent
Apel

(10) Patent No.: US 9,929,565 B2
(45) Date of Patent: Mar. 27, 2018

(54) POWER TRANSMISSION SYSTEM

(75) Inventor: Rolf Apel, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1146 days.

(21) Appl. No.: 13/994,950

(22) PCT Filed: Dec. 17, 2010

(86) PCT No.: PCT/EP2010/070068
§ 371 (c)(1),
(2), (4) Date: Jun. 17, 2013

(87) PCT Pub. No.: WO2012/079645
PCT Pub. Date: Jun. 21, 2012

(65) Prior Publication Data
US 2013/0278061 A1    Oct. 24, 2013

(51) Int. Cl.
*H02J 4/00*    (2006.01)
*H02J 1/14*    (2006.01)

(52) U.S. Cl.
CPC ........ *H02J 4/00* (2013.01); *H02J 1/14* (2013.01); *Y02P 80/14* (2015.11); *Y02P 80/152* (2015.11); *Y10T 307/406* (2015.04)

(58) Field of Classification Search
CPC ........ H02J 1/14; H02J 4/00; H02J 3/46; H02J 3/06; H02J 3/382; Y10T 307/406; Y02E 10/563; G05F 1/147
USPC .......................................................... 307/51
See application file for complete search history.

(56) References Cited

U.S. PATENT DOCUMENTS

| | | |
|---|---|---|
| 4,694,192 A | 9/1987 | Payne et al. |
| 5,500,561 A | 3/1996 | Wilhelm |
| 7,388,364 B2 | 6/2008 | Schweigert et al. |
| 7,652,394 B2 | 1/2010 | Hirst |
| 8,069,359 B2 | 11/2011 | Tolentino |
| 2005/0125104 A1* | 6/2005 | Wilson ............... H02J 3/06 700/295 |
| 2010/0284117 A1 | 11/2010 | Crane |

(Continued)

FOREIGN PATENT DOCUMENTS

| | | |
|---|---|---|
| CN | 101165988 A | 4/2008 |
| CN | 101472327 A | 7/2009 |

(Continued)

*Primary Examiner* — Danny Nguyen
*Assistant Examiner* — Brian K Baxter
(74) *Attorney, Agent, or Firm* — Laurence Greenberg; Werner Stemer; Ralph Locher

(57) ABSTRACT

A power transmission system has at least two local grids which are each connected to loads and are connected to a higher-level power transmission network. The power transmission system has at least one load control unit, each of which is connected directly or indirectly to at least one load of the at least two local grids and is suitable for controlling the consumption of the loads. The load control unit is suitable for evaluating the load state of the at least two local grids and, in the event of an overload which has occurred or is imminent on one of the at least two local grids, for reducing the consumption of at least one load of the local grid and conversely for increasing the consumption of at least one load in one of the other local grids, which is not overloaded, of the at least two local grids.

10 Claims, 7 Drawing Sheets

(56) References Cited

U.S. PATENT DOCUMENTS

| | | | | |
|---|---|---|---|---|
| 2011/0106321 A1* | 5/2011 | Cherian | ................... | H02J 3/00 |
| | | | | 700/286 |
| 2011/0204717 A1* | 8/2011 | Shaffer | ................. | G06Q 40/04 |
| | | | | 307/18 |
| 2011/0289019 A1 | 11/2011 | Radloff et al. | | |
| 2012/0029720 A1* | 2/2012 | Cherian | ................. | H02J 13/00 |
| | | | | 700/297 |
| 2012/0029897 A1* | 2/2012 | Cherian | ................... | H02J 3/00 |
| | | | | 703/18 |
| 2012/0074779 A1* | 3/2012 | Black | ....................... | H02J 3/26 |
| | | | | 307/31 |

FOREIGN PATENT DOCUMENTS

| | | |
|---|---|---|
| RU | 2338311 C2 | 11/2008 |
| RU | 2340992 C2 | 12/2008 |
| WO | 2009104166 A1 | 8/2009 |

* cited by examiner

POWER TRANSMISSION SYSTEM

BACKGROUND OF THE INVENTION

Field of the Invention

The invention relates to a power transmission system, in particular to the distribution level, having at least two local grids which are each connected to loads and are connected to a higher-level power transmission network. As is known, local grids are each connected to a secondary unit substation and by these to the higher-level power transmission network.

It is also known to take into account large loads in the simulation of power transmission systems and to include them in the determination of the optimum power flow and power substation control. This makes it possible inter alia for individual large loads by way of example to be shut down or to have their consumption reduced if the simulation of the power transmission system shows that the power generator cannot produce enough current or that an increase in power production would be disadvantageous.

A simulation of power transmission systems and active load control of the loads requires considerable simulation and computing effort in the case of a high number of power generators and power loads. Despite this it is not always possible to prevent local grids from becoming overloaded.

BRIEF SUMMARY OF THE INVENTION

The invention is based on the object of disclosing a power transmission system which has even better controllability than known power transmission systems.

This object is achieved according to the invention by a power transmission system having the features of claim 1. Advantageous embodiments of the inventive power transmission system are disclosed in the subclaims.

According to the invention it is then provided that the power transmission system has at least one load control unit, each of which is connected directly or indirectly to at least one load of the at least two local grids and is suitable for controlling the consumption of said loads, and moreover the load control unit is suitable for evaluating the load state of the at least two local grids and, in the event of an overload which has occurred or is imminent on one of the at least two local grids, for reducing the consumption of at least one load of said local grid and conversely for increasing the consumption of at least one load in one of the other local grids, which is not overloaded, of the at least two local grids.

A fundamental advantage of the inventive power transmission system lies in the fact that the load control unit provided according to the invention makes restructuring or shifting of the power consumption possible across grids. If a local grid is overloaded and the power consumption needs to be reduced there, the load control unit can increase the power consumption elsewhere and therefore prevent an impact on the higher-level power transmission network and the power generation, or at least reduce this. In other words, the load control unit provided according to the invention can shift the load flow between or among the associated local grids, actively compensate dynamic changes in load and attain a more or less static state for the higher-level power transmission network and higher-level control equipment even though local network overloads occur or are imminent at the level of the local grids, i.e. the state of the network is relatively dynamic.

A further advantage of the inventive power transmission system lies in that a considerable reduction in the variations in the system state and therewith a considerable reduction in the simulation and computing effort in the case of simulation of the entire power transmission system are achieved by the active power flow shift at the local grid level.

The at least two local grids are preferably each connected to a secondary unit substation which connects the associated local grid to the higher-level power transmission network. The local grids are therefore connected only indirectly, namely via the secondary unit substations, to the higher-level power transmission network.

The load control unit is preferably indirectly or directly connected to the secondary unit substations of the at least two local grids. The load control unit can by way of example send control signals for controlling the consumption of the loads indirectly via the respective secondary unit substation to the respective load. The load control unit can also receive load data relating to the load indirectly via the respective secondary unit substation.

Alternatively, the load control unit can send control signals for controlling the consumption of the loads indirectly without intervention of the respective secondary unit substation to the respective load.

The invention also relates to a load control unit for a power transmission system. According to the invention it is provided in this regard that the load control unit is suitable for being indirectly or directly connected to at least one load respectively of at least two, preferably separate, local grids and for controlling the consumption of said loads, and the load control unit is also suitable for evaluating the load state of the at least two local grids and in the event of an overload which has occurred or is imminent on one of the at least two local grids for reducing the consumption of at least one load of this local grid, and conversely for increasing the consumption of at least one load in one of the other local grids, which is not overloaded, of the at least two local grids.

Reference is made with regard to the advantages of the inventive load control unit to the statements above in connection with the inventive power transmission system since the advantages of the inventive load control unit substantially match those of the inventive power transmission system.

The load control unit preferably comprises a programmable data processing system, having by way of example one or more microprocessor(s) which is programmed in such a way that it can carry out the above steps for controlling the load flow as a function of load data. The load control unit preferably also comprises a memory in which the program for carrying out the work steps can be stored.

The invention is also based on a method for controlling a power transmission system having secondary unit substations which are connected on the one hand to a higher-level transmission network and on the other hand to loads by way of an associated local grid in each case.

According to the invention it is provided that the load state of at least two local grids is evaluated and in the event of an overload which has occurred or is imminent on one of the at least two local grids, the consumption of at least one load of this local grid is reduced and conversely the consumption of at least one load in one of the other local grids, which is not overloaded, of the at least two local grids is increased.

Reference is made with regard to the advantages of the inventive method to the above statements in connection with the inventive power transmission system and the inventive load control unit since the advantages of the inventive method match those of the inventive systems.

According to a preferred embodiment of the method it is provided that a load control unit, which is indirectly or directly connected to the secondary unit substations of the at least two local grids, evaluates the load state of the at least two local grids and in the event of an overload which has occurred or is imminent on one of the at least two local grids reduces the consumption of at least one load of this local grid, and conversely increases the consumption of at least one load in one of the other local grids, which is not overloaded, of the at least two local grids.

The load control unit can send control signals for controlling the consumption of the loads indirectly by way of the respective secondary unit substation to the respective load. Alternatively or additionally the load control unit can send control signals for controlling the consumption of the loads directly without intervention of the respective secondary unit substation to the respective load.

The invention will be described in more detail below with the aid of exemplary embodiments, in which, by way of example:

DESCRIPTION OF THE INVENTION

Figure 1:
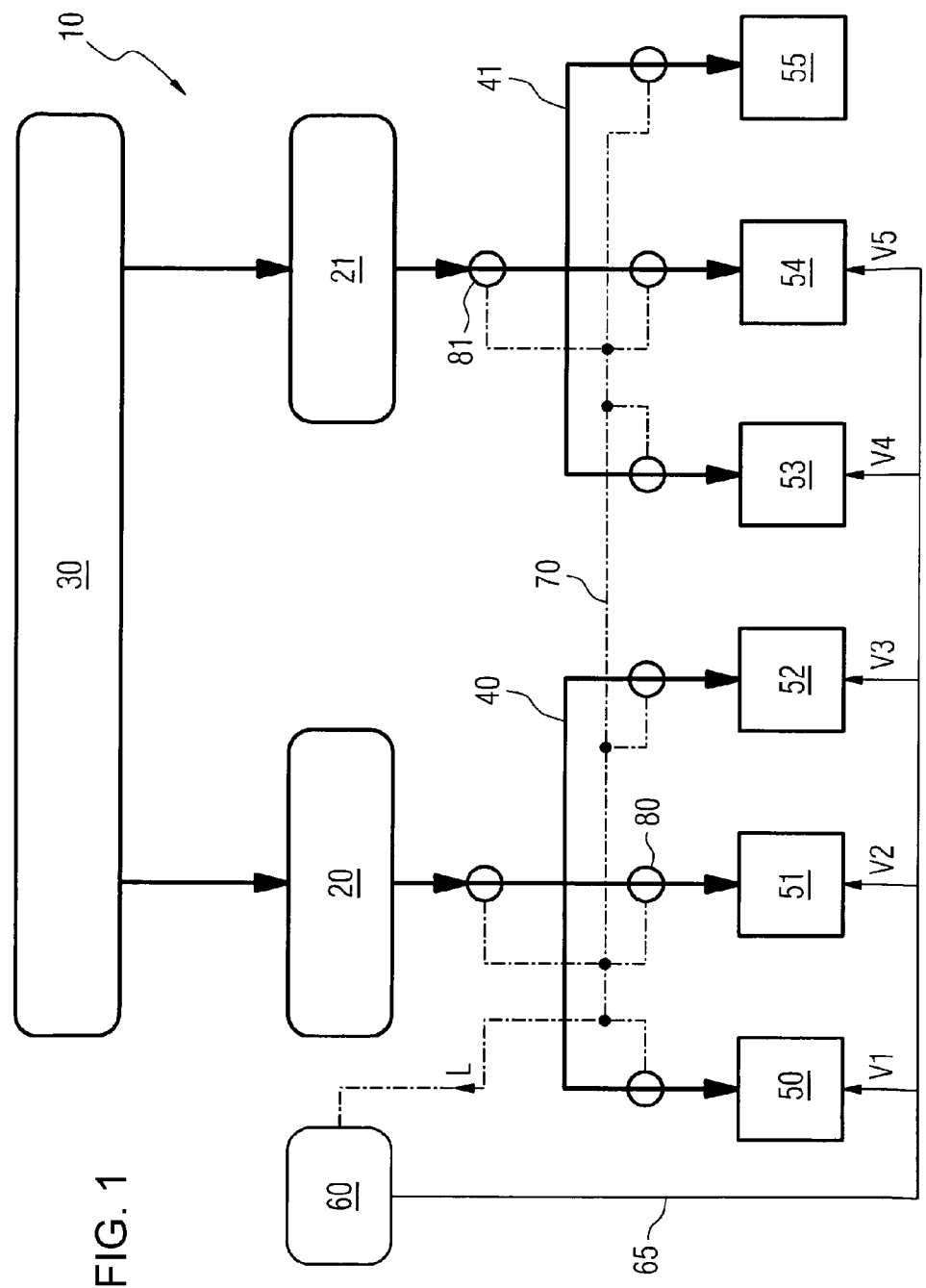
FIGS. 1 to 3 show a first exemplary embodiment for an inventive power transmission system, with the aid of which the inventive method will also be illustrated by way of example.

For reasons of clarity the same reference numerals are used in the figures for identical or comparable components.

A first exemplary embodiment for a power transmission system 10 can be seen in FIG. 1, comprising two secondary unit substations 20 and 21 which are connected to a higher-level power transmission network 30. The two secondary unit substations 20 and 21 are also each connected to an associated local grid 40 and 41, to which loads 50 to 55 are connected. In this exemplary embodiment the loads 50 to 42 are connected to the, in FIG. 1, left local grid 40 and the loads 53 to 55 are connected to the, in FIG. 1, right local grid 41. In the exemplary embodiment according to FIG. 1 loads 50 to 54 can be controlled; load 55, by contrast, cannot be controlled.

The two local grids 40 and 41 are by way of example grids which are separate from each other. The power flow from the higher-level power transmission network 40 to the loads 50 to 55 is marked by arrows with a thick line width in FIG. 1.

FIG. 1 also shows a load control unit 60 which is connected to loads 50 to 52 of the local grid 40 and to loads 53 and 54 of the local grid 41. The load control unit 60 is used to control the consumption of the controllable loads 50 to 54 by way of control connections 65, as will be described in more detail below. To control the loads 50 to 54 the load control unit 60 generates individual load control signals V1 to V5 which define the desired consumption for the respective load.

The load control unit 60 is connected directly or indirectly by way of data links 70 to a large number of sensors which are arranged in the two local grids 40 and 41 and of which two are identified by way of example in FIG. 1 by reference numerals 80 and 81. Alternatively or additionally sensors can be arranged within the secondary unit substations 20 and 21. The load data L, which, by way of example, may be current, voltage, active power, reactive power or other measured values, supplied by the sensors describe the load state of the two local grids 40 and 41.

Figure 2:
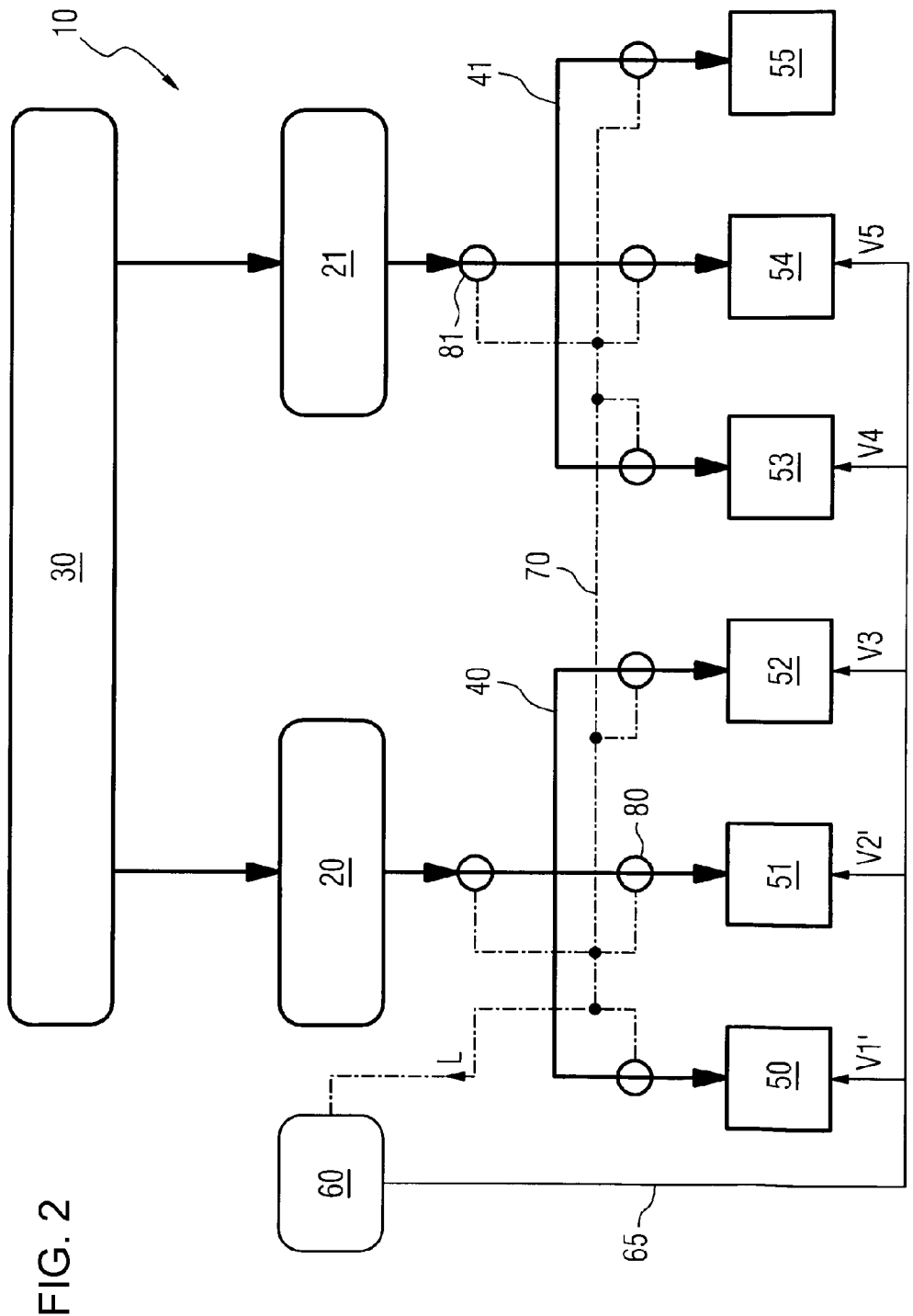

The arrangement according to FIG. 1 can be described by way of example as follows:

Using the load data L present at the input side the load control unit 60 determines for each of the two local grids 40 and 41 the respective load state and evaluates the load state. In the event of an overload, which has occurred or is imminent, of one of the at least two local grids the load control unit 60 will reduce the consumption of at least one load in this local grid and conversely will increase the consumption of at least one load in one of the other local grids, which is not overloaded. This shall be illustrated in more detail with the aid of an example:

If, by way of example, the load control unit 60 determines that the local grid 40 is overloaded, it will reduce the consumption of one or more of the controllable load(s), by way of example that of loads 50 and 51, by an amount of power $\Delta E1$ or $\Delta E2$ ($\Delta E1+\Delta E2<0$) by transmitting modified load control signals $V1'=f(\Delta E1)$ and $V2'=f(\Delta E2)$ to these loads 50 and 51 (cf. FIG. 2).

So the reduction in consumption does not have any impact on the power transmission network 30, and therewith an indirect impact on power generation, the load control unit 60 will increase the power consumption in the local grid 41, provided this is not also overloaded, by increasing by way of example the consumption of load 53 by an amount of power $\Delta E4$ ($\Delta E4>0$). The load control unit 60 can achieve this by way of example with a modified load control signal $V4'=f(\Delta E4)$ which signals an increase in consumption to the load 53 (cf. FIG. 3).

The modified load control signals V1', V2' and V4' are preferably selected by the load control unit 60 in such a way that by taking into account the signs the following applies:

$$\Delta E1+\Delta E2+\Delta E4=0$$

Figure 3:
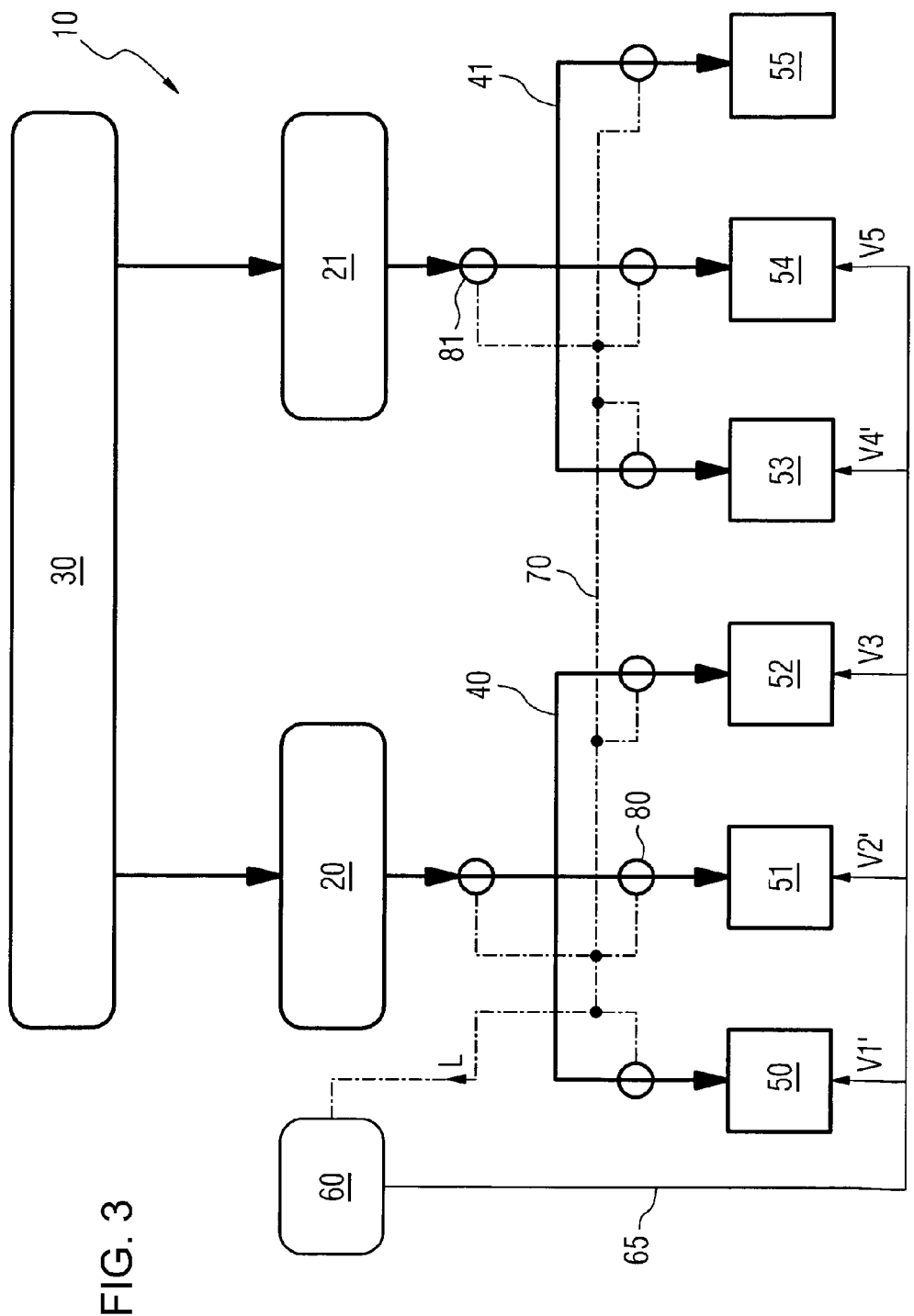

In the exemplary embodiment according to FIGS. 1 to 3 the load control unit 60 is directly connected by the control connections 65 to the loads 50 to 54, so control can occur directly by means of the load control signals V1 to V5.

The control connections 65 can be formed by electrical or optical cables or by radio links. The telecommunications network, Internet, mobile phone network or other communications services may be used to form the control connections 65. The control connections 65 may also be based on electrical signals which are transmitted via the respective local grid 40 or 41.

The same applies to the data links 70: the data links 70 can also be formed by electrical or optical cables or by radio links. The telecommunications network, Internet, mobile phone network or other communications services may be used to form the data links 70. The data links 70 may also be based on electrical control signals which are transmitted via the respective local grid 40 or 41.

Figure 4:
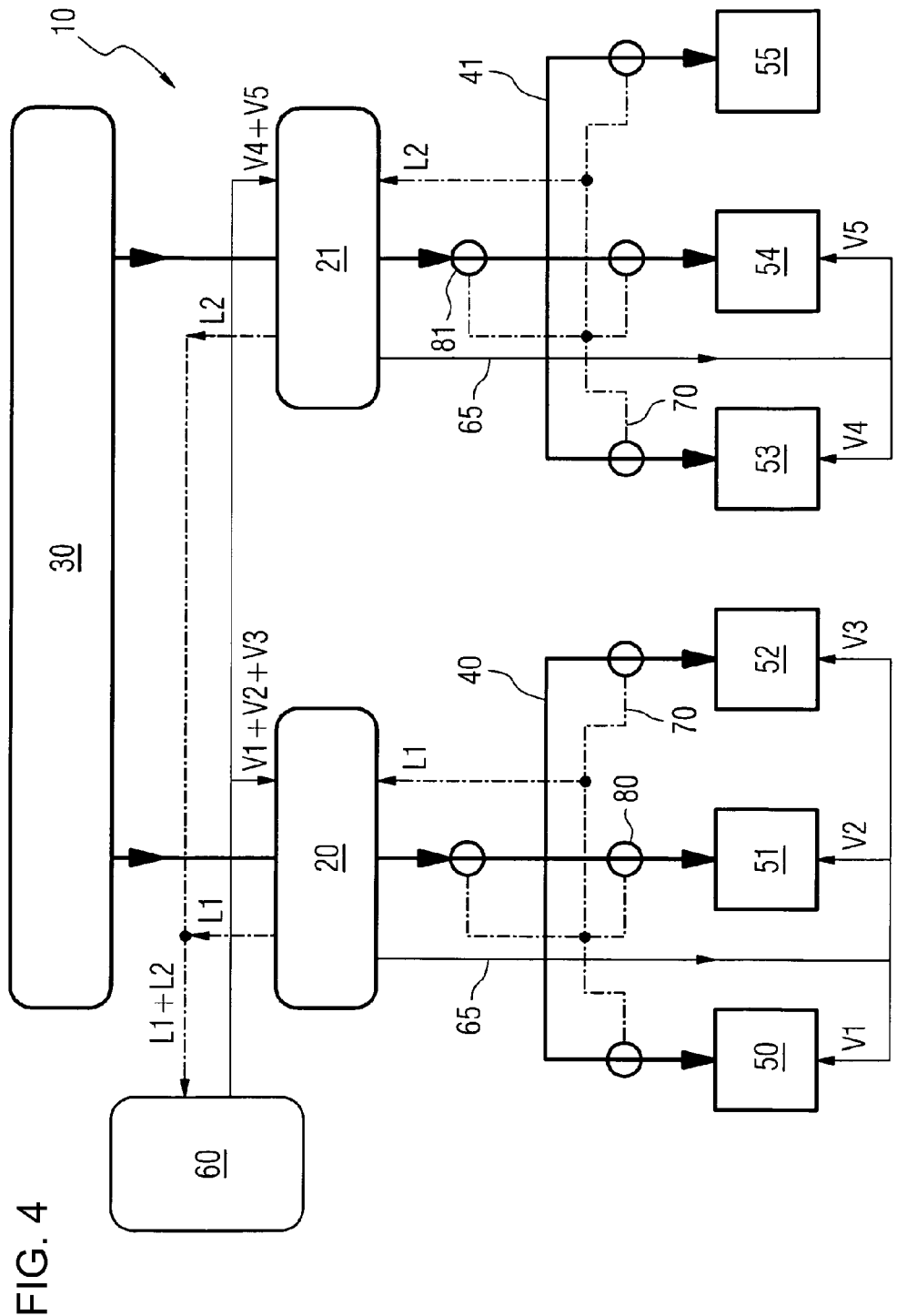
FIG. 4 shows a second exemplary embodiment for an inventive power transmission system.

FIG. 4 shows a second exemplary embodiment for a power transmission system 10. In this exemplary embodiment the load control unit 60 is connected to the two secondary unit substations 20 and 21 and is connected to the loads 50 to 54 only indirectly via the secondary unit substations. The load data L1 and L2 supplied by the sensors is transmitted indirectly via the respective secondary unit substations 20 and 21 to the load control unit 60.

The load control unit 60 evaluates the load data L1 and L2 supplied by the sensors and generates load control signals V1 to V5, as has been described in connection with FIGS. 1 to 3. The load control signals V1 to V5 are transmitted via the secondary unit substations 20 and 21 to the respective loads.

The control connections 65 for transmitting the load control signals V1 to V5 can be formed by electrical or optical cables or by radio links in this exemplary embodiment as well. The telecommunications network, Internet, mobile phone network or other communications services may be used to form the control connections 65. The control connections 65 may also be based on electrical control signals which are transmitted via the respective local grid 40 or 41.

The same applies to the data links 70: the data links 70 can be formed by electrical or optical cables or by radio links in this exemplary embodiment as well. The telecommunications network, Internet, mobile phone network or other communications services may be used to form the data links 70. The data links 70 may also be based on electrical control signals which are transmitted via the respective local grid 40 or 41.

Figure 5:
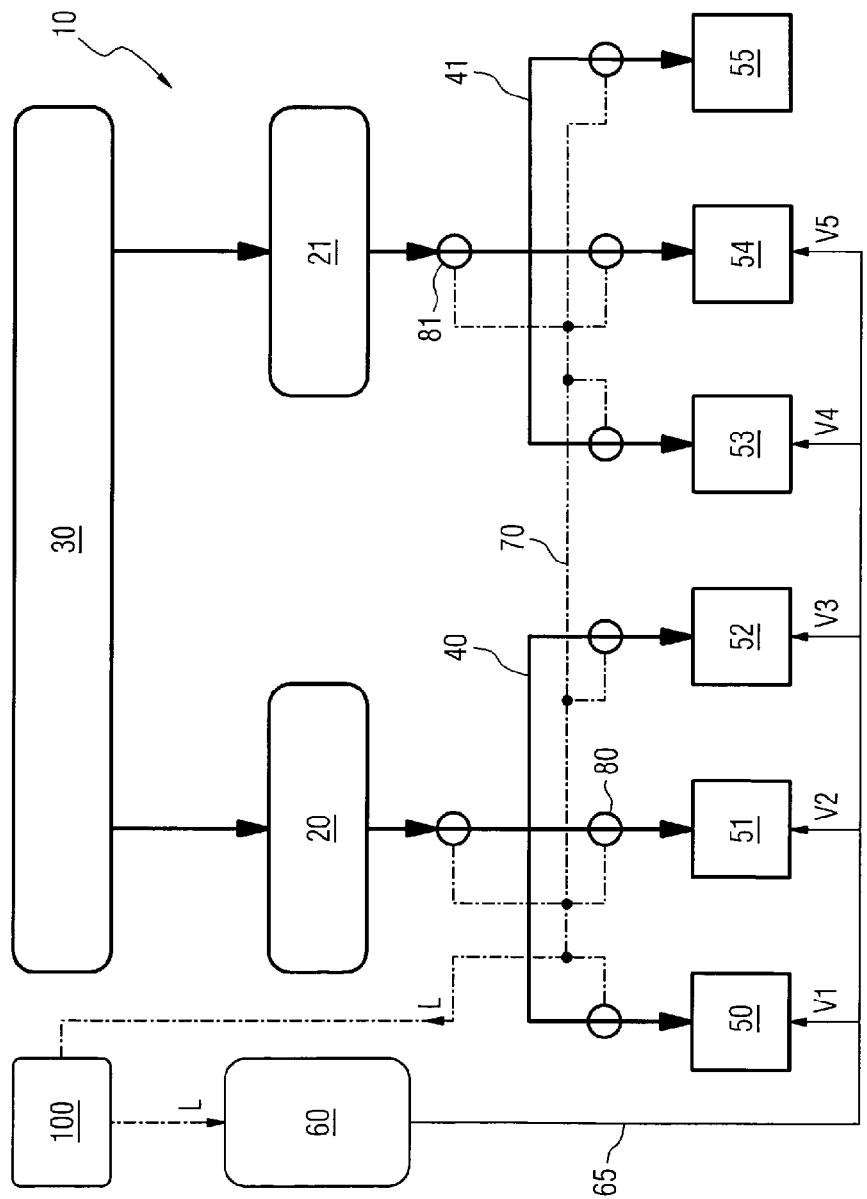
FIG. 5 shows a third exemplary embodiment for an inventive power transmission system.

FIG. 5 shows a third exemplary embodiment for a power transmission system 10. In this exemplary embodiment the load control unit 60 is connected to a central control system 100 from which it receives the load data L from the sensors or load data derived therefrom. The load control unit 60 evaluates the load data L or the derived load data and generates the load control signals V1 to V5, as has been described in connection with FIGS. 1 to 3. The load control signals V1 to V5 are transmitted via the control connections 65 from the load control unit 60 directly to the loads 50 to 54.

Figure 6:
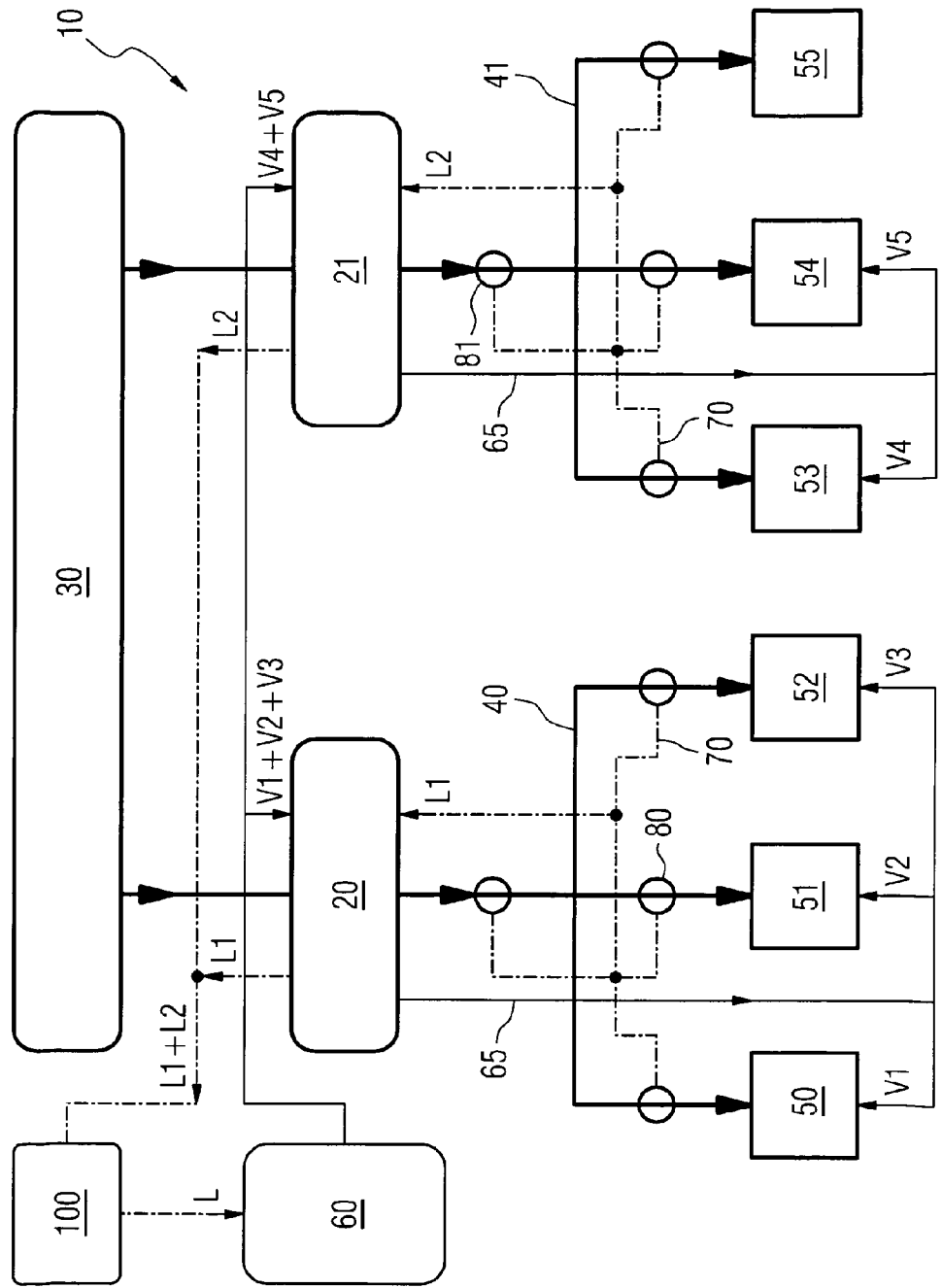
FIG. 6 shows a fourth exemplary embodiment for an inventive power transmission system.

FIG. 6 shows a fourth exemplary embodiment for a power transmission system 10. In this exemplary embodiment the load control unit 60—as in the exemplary embodiment according to FIG. 5—is connected to a central control system 100 from which it receives the load data L from the sensors or load data derived from this load data. The load control unit 60 evaluates the load data L or the derived load data and generates the load control signals V1 to V5, as has been described in connection with FIGS. 1 to 3.

In the exemplary embodiment according to FIG. 6 the load data L from the sensors passes indirectly via the secondary unit substations 20 and 21 to the central control system 100. For this purpose the secondary unit substation 20 transmits the load data L1 from the sensors, which belong to the local grid 40, to the central control system 100, and the secondary unit substation 21 transmits the load data L2 from the sensors, which belong to the local grid 41, to the central control system 100.

The load control unit 60 is also connected to the two secondary unit substations 20 and 21 and transmits the load control signals V1 to V5 indirectly via the secondary unit substations 20 and 21 to the respective loads.

Figure 7:
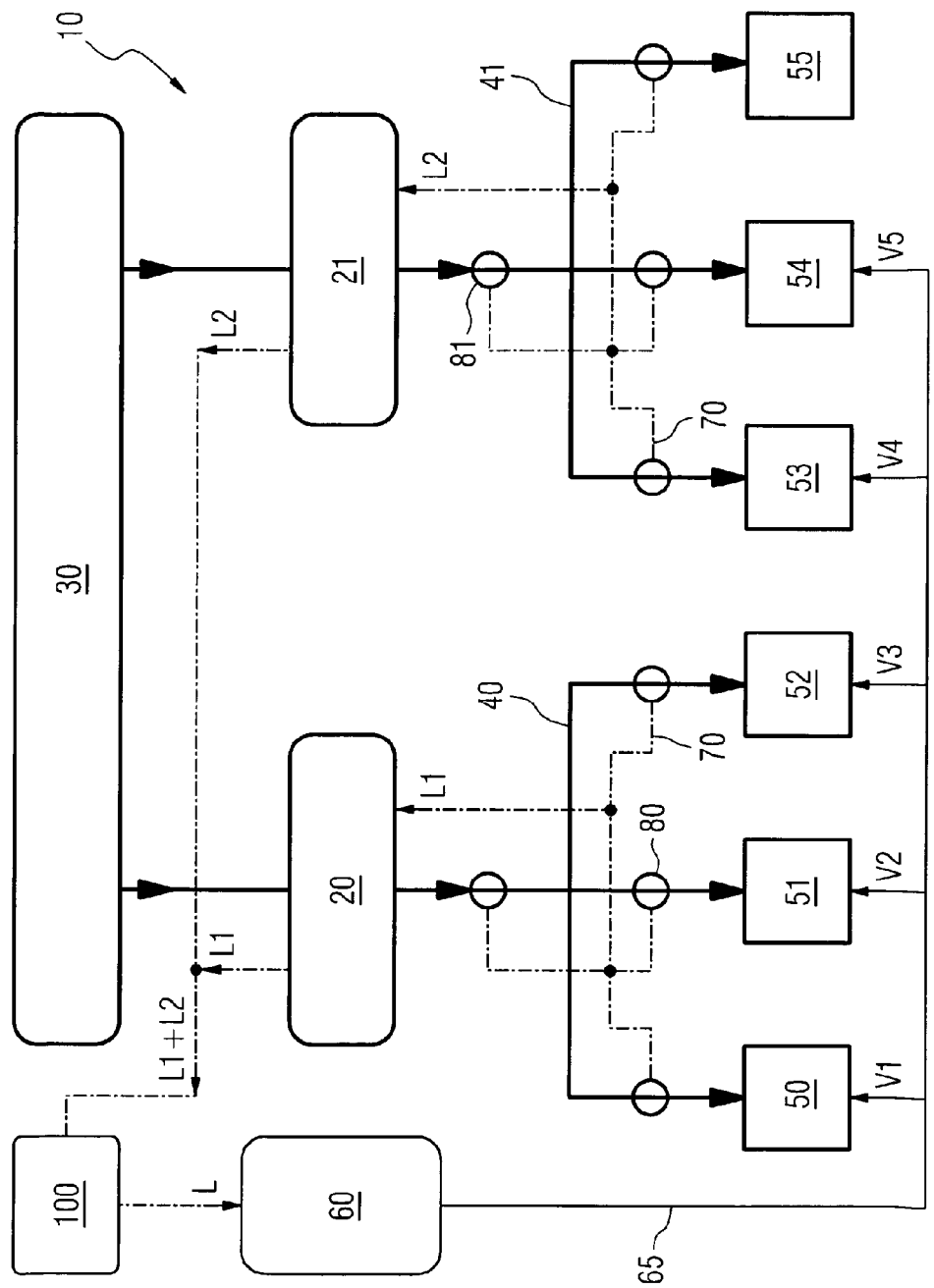
FIG. 7 shows a fifth exemplary embodiment for an inventive power transmission system.

FIG. 7 shows a fifth exemplary embodiment for a power transmission system 10. In this fifth exemplary embodiment the central control system 100 receives the load data L1 and L2 from the two local grids 40 and 41 via the two secondary unit substations 20 and 21. The central control system 100 guides the load data L, which is composed of individual load data L1 and L2, or load data derived therefrom to the load control unit 60. The load control unit 60 evaluates this and generates the load control signals V1 to V5, as has been illustrated in connection with FIGS. 1 to 3. The load control signals V1 to V5 are transmitted from the load control unit 60 to the loads directly via the control connections 65.

LIST OF REFERENCE CHARACTERS 10 power transmission system
20 secondary unit substation
21 secondary unit substation
30 power transmission network
40 local grid
41 local grid
50-54 controllable load
55 non-controllable load
60 load control unit
65 control connections
70 data links
80 sensor
81 sensor
100 central control system
L load data
L1 load data
L2 load data
V1-V5 load control signal
V1' modified load control signal
V2' modified load control signal
V4' modified load control signal

The invention claimed is:

1. A power transmission system, comprising:
at least two local grids each connected to loads and connected to a higher-level power transmission network;
at least one load control unit connected directly or indirectly to at least one of the loads of said at least two local grids, said at least one load control unit being configured for controlling a consumption of said loads; and
said least one load control unit being configured for evaluating a load state of said at least two local grids and, in the event of an overload that has occurred or that is imminent on one of said at least two local grids, for reducing a consumption of at least one of the loads of the respective said local grid and conversely for increasing a consumption of at least one of the loads in another of said local grids, which is not overloaded, of said at least two local grids;
wherein said load control unit simulates power flow calculations to determine whether the overload has occurred or is imminent on said one of said at least two local grids and to determine whether the other one of said local grids is not overloaded by increasing the consumption of at least one of the loads in the other one of said local grids.

2. The power transmission system according to claim 1, wherein each of said at least two local grids is connected to a respective secondary unit substation connecting the associated said local grid to said higher-level power transmission network.

3. The power transmission system according to claim 2, wherein said at least one load control unit is indirectly or directly connected to said secondary unit substations of said at least two local grids.

4. The power transmission system according to claim 3, wherein said at least one load control unit is configured to send control signals for controlling a consumption of the loads indirectly via the respective said secondary unit substation to the respective load.

5. The power transmission system according to claim 1, wherein said at least one load control unit sends control signals for controlling the consumption of the loads directly without intervention of the respective secondary unit substation to the respective load.

6. In a power transmission system according to claim 1, a load control unit for the power transmission system, wherein:

said load control unit is configured for indirect or direct connection to at least one load respectively of at least two local grids and for controlling a power consumption of the loads; and said load control unit is further configured for evaluating a load state of the at least two local grids and, on occasion of an overload that has occurred or is imminent on one of the at least two local grids, for reducing the power consumption of at least one load of the respective local grid, and conversely for increasing a consumption of at least one load in another one of the local grids, which is not overloaded, of the at least two local grids;

wherein said load control unit simulates power flow calculations to determine whether the overload has occurred or is imminent on said one of the at least two local grids and to determine whether the other one of said local grids is not overloaded by increasing the consumption of at least one of the loads in the other one of the local grids.

7. A method of controlling a power transmission system having secondary unit substations connected, on the one hand, to a higher-level transmission network and, on the other hand, to loads by way of an associated local grid in each case, the method which comprises:

evaluating a load state of at least two local grids;

in an event of an overload that has occurred or is imminent on one of the at least two local grids, reducing a consumption of at least one load of the respective local grid and, conversely, increasing a consumption of at least one load in another one of the local grids, which is not overloaded, of the at least two local grids;

wherein power flow calculations are simulated to determine whether the overload has occurred or is imminent on the one of the at least two local grids and to determine whether the other one of the local grids is not overloaded by increasing the consumption of at least one of the loads in the other one of the local grids.

8. The method according to claim 7, which comprises evaluating the load state of the at least two local grids with a load control unit that is indirectly or directly connected to the secondary unit substations of the at least two local grids.

9. The method according to claim 8, which comprises sending control signals with the load control unit for controlling the consumption of the loads indirectly via the respective secondary unit substation to the respective load.

10. The method according to claim 8, which comprises sending control signals for controlling the consumption of the loads with the load control unit directly without intervention of a respective secondary unit substation to the respective load.

* * * * *